(12) United States Patent
Bates et al.

(10) Patent No.: US 9,005,686 B2
(45) Date of Patent: *Apr. 14, 2015

(54) DENSITY MODIFICATION

(75) Inventors: Darren Bates, Twin Waters (AU);
Warwick Bagnall, Waratah (AU)

(73) Assignee: Cavitus Pty Ltd (AU)

( * ) Notice: Subject to any disclaimer, the term of this patent is extended or adjusted under 35 U.S.C. 154(b) by 285 days.

This patent is subject to a terminal disclaimer.

(21) Appl. No.: 13/320,751

(22) PCT Filed: Apr. 8, 2010

(86) PCT No.: PCT/AU2010/000400
§ 371 (c)(1),
(2), (4) Date: May 24, 2012

(87) PCT Pub. No.: WO2010/129985
PCT Pub. Date: Nov. 18, 2010

(65) Prior Publication Data
US 2012/0225172 A1    Sep. 6, 2012

(30) Foreign Application Priority Data

May 14, 2009  (AU) ................................ 2009902154

(51) Int. Cl.
*A23L 1/025* (2006.01)
*A23L 2/50* (2006.01)
*A23L 3/30* (2006.01)
*A23L 2/76* (2006.01)
*A23L 1/015* (2006.01)
*B01D 19/00* (2006.01)

(52) U.S. Cl.
CPC ................. *A23L 1/0252* (2013.01); *A23L 2/50* (2013.01); *A23L 3/30* (2013.01); *A23L 2/76* (2013.01); *A23L 1/015* (2013.01); *B01D 19/0078* (2013.01)

(58) Field of Classification Search
CPC ......... A23L 1/015; A23L 1/0252; A23L 2/76; A23L 2/50; A23L 3/30; B01J 19/10
USPC ............. 426/238, 234, 486–487; 204/157.62; 222/196–203; 53/111 R
See application file for complete search history.

(56) References Cited

U.S. PATENT DOCUMENTS 3,073,705 A     1/1963  Rivoche
3,157,519 A  *  11/1964 Butt .............................. 426/238

(Continued)

FOREIGN PATENT DOCUMENTS

EP    1084621        3/2001
GB    1048324 A     11/1966

(Continued)

OTHER PUBLICATIONS

"Ultrasonic Innovations in the Food Industry—From the Laboratory to Commercial Production," www.innovativeultrasonics.com, available online on Oct. 2007 at http://www.innovativeultrasonics.com.

(Continued)

*Primary Examiner* — Drew Becker
(74) *Attorney, Agent, or Firm* — Alston & Bird LLP

(57) ABSTRACT

The present invention relates to a method for modifying the density of a flowable material in need thereof comprising applying highly propagating ultrasonic energy at frequency of between about 16 kHz to about 40 kHz to the material wherein the highly propagating ultrasonic energy is uniformly distributed throughout the material thereby modifying the density of the material.

18 Claims, 3 Drawing Sheets

(56) References Cited

U.S. PATENT DOCUMENTS

| | | |
|---|---|---|
| 3,285,579 A | 11/1966 | Guerin |
| 3,352,693 A | 11/1967 | Berk |
| 3,649,358 A | 3/1972 | Johnston, II |
| 3,667,967 A | 6/1972 | Colfart |
| 3,743,523 A | 7/1973 | Bodine |
| 4,316,734 A | 2/1982 | Spinosa et al. |
| 4,353,928 A | 10/1982 | Seliger et al. |
| 4,448,750 A | 5/1984 | Fuesting |
| 4,746,522 A | 5/1988 | Wofford et al. |
| 4,786,515 A | 11/1988 | Miller et al. |
| 4,946,702 A | 8/1990 | Stipp et al. |
| 5,109,922 A | 5/1992 | Joseph |
| 5,429,831 A | 7/1995 | Williams et al. |
| 5,512,309 A | 4/1996 | Bender et al. |
| 5,531,157 A | 7/1996 | Probst |
| 5,690,990 A | 11/1997 | Bonner |
| 5,714,188 A | 2/1998 | Gilchrist |
| 6,054,150 A | 4/2000 | Tobe et al. |
| 6,293,754 B1 | 9/2001 | Liang et al. |
| 6,309,685 B1 | 10/2001 | Kozari et al. |
| 6,685,978 B1 | 2/2004 | Hauksson |
| 7,063,867 B2 | 6/2006 | Tyler et al. |
| 7,357,835 B2 * | 4/2008 | McCausland et al. ........... 117/68 |
| 7,604,126 B2 | 10/2009 | Patist et al. |
| 8,343,562 B2 * | 1/2013 | Bates et al. .................... 426/238 |
| 2004/0191374 A1 | 9/2004 | Weng et al. |
| 2005/0008739 A1 * | 1/2005 | Talukdar et al. ............... 426/238 |
| 2005/0267628 A1 * | 12/2005 | Crowder et al. ............... 700/240 |
| 2006/0086646 A1 | 4/2006 | Patist et al. |
| 2006/0110503 A1 * | 5/2006 | Bates et al. .................... 426/238 |
| 2006/0204624 A1 | 9/2006 | Patist et al. |
| 2006/0210679 A1 * | 9/2006 | Leonhardt et al. ............ 426/238 |
| 2008/0156737 A1 | 7/2008 | Janssen et al. |
| 2008/0199589 A1 | 8/2008 | Patist et al. |
| 2008/0206410 A1 | 8/2008 | Efstathiou et al. |
| 2008/0317913 A1 * | 12/2008 | Brophy et al. ................. 426/238 |
| 2009/0220652 A1 | 9/2009 | Gardner et al. |
| 2010/0015302 A1 | 1/2010 | Bates et al. |
| 2010/0209568 A1 | 8/2010 | Brown et al. |
| 2011/0278153 A1 | 11/2011 | Bates et al. |

FOREIGN PATENT DOCUMENTS

| | | |
|---|---|---|
| GB | 1053051 | 12/1966 |
| WO | WO 92/18011 | 10/1992 |
| WO | WO 95/18537 | 7/1995 |
| WO | WO 99/11138 | 3/1999 |
| WO | WO 2004/039175 A1 | 5/2004 |
| WO | WO 2006/104462 A1 | 10/2006 |
| WO | WO 2007/047525 A2 | 4/2007 |
| WO | WO 2007/070686 | 6/2007 |
| WO | WO 2007/109060 A2 | 9/2007 |
| WO | WO 2008/074072 A1 | 6/2008 |
| WO | WO 2008/103579 A1 | 8/2008 |
| WO | WO 2010/012032 A1 | 2/2010 |

OTHER PUBLICATIONS

Ahn et al., "Effects of Added Pigments, Salt, and Phosphate on Color, Extractable Pigment, Total Pigment, and Oxidation Reduction Potential in Turkey Breast Meat," Poultry Science, 68:1088-1099, (1989).

Chu, "Brining," www.cookingforengineers.com, available online on Nov. 1, 2004 at http://www.cookingforengineers.com/article70/Brining.

EPO Application No. EP20090802273, Supplementary European Search Report and European Search Opinion mailed Mar. 8, 2013.

HU 212372, Derwent Publications Ltd., XP-002448140, 1 page, (1996). Abstract.

JP 3240433, Derwent Publications Ltd., XP-002448142, 1 page, (1991). Abstract.

Mizrahi et al, "Ultrasonic Waves in the Concentration of Citrus Juices", Process Biochemistry, 3(10):25-27, (1986).

PCT/AU2009/000966, PCT International Report on Patentability completed Jun. 8, 2010.

PCT/AU2009/000966, PCT International Search Report mailed Sep. 22, 2009.

PCT/AU2009/000966, PCT Written Opinion of the International Searching Authority mailed Sep. 22, 2009.

PCT/US2007/006455, PCT International Report on Patentability issued Sep. 16, 2008.

PCT/US2007/006455, PCT International Search Report mailed Sep. 6, 2007.

PCT/US2007/006455, PCT Written Opinion of the International Searching Authority mailed Sep. 6, 2007.

SU 1717063, Derwent Publications Ltd., XP-002448141, 1 page, (1992). Abstract.

SU 544412, Derwent Publications Ltd., XP-002448139, 1 page, (1977). Abstract.

U.S. Appl. No. 12/224,971, Final Office Action mailed Mar. 22, 2011.

U.S. Appl. No. 12/224,971, Non-Final Office Action mailed Sep. 28, 2010.

U.S. Appl. No. 12/224,971, Non-Final Office Action mailed Oct. 21, 2013.

Ultrasonics., Dictionary of Food Science and Technology, 2nd Edition, pp. 437-438, (2009).

Weissler, "Sonochemistry : The Production of Chemical Changes with Sound Waves," The Journal of the Acoustical Society of America, 25(4):651-657, (1953).

Knorr, et al., "Applications and potential of ultrasonics in food processing," *Trends in Food Science & Technology*, 15:261-266 (2004).

PCT/AU2010/000400 International Search Report mailed May 20, 2010.

PCT/AU2010/000400 Written Opinion and International Preliminary Report on Patentability mailed Nov. 15, 2011.

Provy, et al., "Ultrasound in Food Processing," *Blackie Academic & Professional Publishers*, pp. 105-126, (1995).

Pozar, et al., "Application of High-Amplitude Ultrasound for Non-Destructive Evaluation," *10th International Conference of Slovenian Society for Non-Destructive Testing*, pp. 85-90, (2009).

U.S. Appl. No. 13/056,645, Restriction Requirement mailed Nov. 22, 2013.

U.S. Appl. No. 12/224,971, Advisory Action mailed Jul. 8, 2011.

Wrigley, et al., "Decrease of *Salmonella typhimurium* in Skim Milk and Egg by Heat and Ultrasonic Wave Treatment," Journal of Food Protection, 55(9):678-680 (1992).

U.S. Appl. No. 13/056,645, Non-Final Office Action mailed Jan. 14, 2015.

* cited by examiner

DENSITY MODIFICATION

CROSS REFERENCE TO RELATED APPLICATION

This application is a U.S. National Satge application filed under 35 U.S.C. 371 of PCT/AU2010/000400 filed Apr. 8, 2010, claims priority to Australian application no. 2009902154 filed May 14, 2009, which are incorporated herein by reference.

TECHNICAL FIELD

The invention relates to methods of using highly propagating ultrasonic energy to modify the density of flowable materials. In particular the invention relates to methods of using highly propagating ultrasonic energy to modify the density of flowable materials such as foods, beverages, food, dairy, agricultural or non-food products.

BACKGROUND

There are a limited number of methods for modifying the density of flowable material such as liquids, foods, beverages, dairy, agricultural or non-food products where low and/or variable density results from for example entrained gas or dissolved gas. Gas entrainment or non-uniform density of a material creates packaging line problems which include insufficient fill levels or over filling such that consistency in filling is lost. Expansion of the material post filling may result in compromised seal integrity, foaming of the material or reduced shelf life due to gas entrainment. Further, gas entrainment may compromise uniformity of a food and beverage product after packaging thus contributing to rejection or re-call of the product.

Consistent fill levels and uniformity in a packaged material may be attained by the application of a vacuum, settling in large tanks or a reduction of packaging line or bottling operation speed. Combinations of those methods to modifying the density of the material may also be used.

A problem with these methods is that they increase the equipment needed and/or involve additional processes, are expensive and require production times to be increased.

Conventional ultrasonic baths have been utilised to modify the density of a wide variety of liquids on a small scale. The ultrasonic energy that is produced by the conventional ultrasound bath is in the form of a standing wave so that when, for example, a liquid is placed in the bath, the pattern of energy waves shows alternating zones in the liquid. In order to achieve a greater effect in terms of modifying the density of a material, the material needs to be moved relative to the standing wave that forms in the ultrasonic bath which can be impractical for large volumes of material.

Furthermore, conventional ultrasonic baths produce energy waves that dissipate very quickly with distance and do not propagate uniformly through flowable materials.

The present invention is predicated on the surprising discovery that the application of highly propagating ultrasonic energy to a flowable material modifies the density of that material.

SUMMARY

In a first aspect of the invention there is provided a method for modifying the density of a flowable material in need thereof comprising (i) applying highly propagating ultrasonic energy at frequency of between about 16 kHz to about 40 kHz to the material wherein the highly propagating ultrasonic energy is uniformly distributed throughout the material thereby modifying the density of the material.

In a second aspect there is provided a method for modifying the density of a flowable material in need thereof comprising;

(i) applying highly propagating ultrasonic energy at frequency of between about 16 kHz to about 40 kHz to a material wherein the highly propagating ultrasonic energy is uniformly distributed throughout the material thereby modifying the density of the material;

(ii) applying heat to the mixture.

In one embodiment the heat and highly propagating ultrasonic energy act synergistically to modify the density of the material.

In a third aspect there is provided a method for modifying the density of a flowable material in need thereof comprising;

(i) applying highly propagating ultrasonic energy at frequency of between about 16 kHz to about 40 kHz to the material wherein the highly propagating ultrasonic energy is uniformly distributed throughout the material thereby modifying the density of the material and;

(ii) applying pressure to the mixture.

In one embodiment the pressure and highly propagating ultrasonic energy act synergistically to modify the density of the material.

In a fourth aspect there is provided a method for modifying the density of a flowable material in need thereof comprising;

(i) applying highly propagating ultrasonic energy at frequency of between about 16 kHz to about 40 kHz to the material wherein the highly propagating ultrasonic energy is uniformly distributed throughout the material thereby modifying the density of the material and;

(ii) homogenising or emulsifying the material.

In one embodiment the homogenisation or emulsification and highly propagating ultrasonic energy act synergistically to modify the density of the is material.

In a fifth aspect there is provided a method for modifying the density of a flowable material in need thereof comprising;

(i) applying highly propagating ultrasonic energy at frequency of between about 16 kHz to about 40 kHz to the material wherein the highly propagating ultrasonic energy is uniformly distributed throughout the material thereby modifying the density of the material and;

(ii) mixing or agitating the material.

In one embodiment the mixing or agitation and highly propagating ultrasonic energy act synergistically to modify the density of the material.

In a sixth aspect there is provided a method for modifying the density of a flowable material in need thereof comprising;

(i) applying highly propagating ultrasonic energy at frequency of between about 16 kHz to about 40 kHz to the material wherein the highly propagating ultrasonic energy is uniformly distributed throughout the material thereby modifying the density of the material and;

(ii) applying a vacuum to the material.

In one embodiment the vacuum and highly propagating ultrasonic energy act synergistically to modify the density of the material.

In a seventh aspect there is provided a method for modifying the density of a flowable material in need thereof comprising;

(i) adding a polymer to the material (ii) applying highly propagating ultrasonic energy at frequency of between about 16 kHz to about 40 kHz to the material wherein the highly propagating ultrasonic energy is uniformly distributed throughout the material thereby modifying the density of the material.

In one embodiment the polymer and highly propagating ultrasonic energy act synergistically to modify the density of the material.

The material may be provided as a pre-mixture of a solid and a liquid.

The material may be an aqueous liquid or non-aqueous liquid.

The material may be substantially non-liquid

In preferred embodiments the frequency of the highly propagating ultrasonic energy is the resonant frequency of the material.

The amplitude of the highly propagating ultrasonic energy may be between about 0.01 to about 150 microns. The highly propagating ultrasonic energy may be applied over a period of time between about 0.001 second to about 24 hours.

The temperature of the material may be between about 1° C. and about 900° C.

The temperature of the material may be less than about 1° C.

The pressure applied to the material may be between about 0.1 bar and about 10 bar. In a preferred embodiment the pressure is between about 2 bar and about 4 bar.

In an eighth aspect there is provided a process for enhancing the density of a flowable material during the packaging or bottling phase comprising emitting highly propagating ultrasonic energy from a transducer or sonotrode and application of that highly propagating ultrasonic energy to a material.

The highly propagating ultrasonic energy may be emitted from either high amplitude transducers attached to the outside of the equipment, sonotrodes internally mounted in direct contact with the material being processed or using sonotrodes via a coupling fluid creating highly propagating radial ultrasonic energy through equipment surfaces into a flow stream of the material.

In an ninth aspect there is provided a method of modifying the density of a flowable material comprising application of highly propagating ultrasonic energy to a flow stream thereby modifying the density or rheological properties of the material wherein the ultrasonic energy propagates across and through multiple surfaces.

In a tenth aspect there is provided a method of modifying the density of a flowable material present in a flow stream comprising the material as the flow stream passes through an apparatus, the method comprises;

(i) attaching a high power transducer to an external surface of the apparatus;

(ii) operating the transducer to emit highly propagating ultrasonic energy, wherein the highly propagating ultrasonic energy propagates across and through multiple surfaces and is applied to the material and wherein the application of highly propagating ultrasonic energy to said material thereby modifies the density of the material.

In a eleventh aspect there is provided a method of enhancing the density of materials during packaging comprising applying highly propagating ultrasonic energy to a material flow stream or to equipment containing the material.

The highly propagating ultrasonic energy may be applied from a high power transducer (frequency 16 kHz to 500 kHz) in contact with the equipment therefore creating highly propagating radial waves across and through multiple surfaces. The highly propagating ultrasonic energy may be applied from a sonotrode immersed into a coupling liquid.

The sonotrode vibrates at a frequency of between 16 KHz and 500 KHz and emits a radial energy wave relative to the sonotrode, wherein the radial energy wave travels through the equipment and/or material flow stream and enhances the density of the material.

The transducer may include a vibration direction conversion member.

The frequency may be between about 16 kHz and about 40 kHz or between about 16 kHz and about 30 kHz or between about 16 to about 25 kHz or between about 16 to about 20 kHz. The frequency may be about the resonance frequency of the material.

The temperature of the material may be between 0° C. and 900° C.

The temperature of the material may be less than about 1° C.

The energy wave may be high distance propagating wave through mediums of 1 to 90% solids content.

The energy wave may be a highly penetrating wave across and through the surface and into food/liquid streams sometimes containing solid structures.

The equipment may be a conduit, pipe, tank or vessel.

The highly propagating ultrasonic energy may be synergistically combined with vacuum, pressure, heat, homogenization or polymer chemicals.

The highly propagating ultrasonic energy may be applied to the material at an average specific energy between $1 \times 10^{-7}$ kWh and $1 \times 10^{-1}$ kWh ultrasonic energy per liter of material, more preferably between $1 \times 10^{-4}$ kWh and $1 \times 10^{-2}$ kWh ultrasonic energy per liter of material.

The highly propagating ultrasonic energy may be applied to the material at an energy density of between about of 0.000001 watt/cm$^3$ to 1000 watt/cm$^3$ or between about 0.0001 watt/cm$^3$ to about 1000 watts/cm$^3$ or between about 0.0001 watt/cm$^3$ to about 100 watts/cm$^3$ or between about 0.001 watt/cm$^3$ to about 10 watts/cm$^3$ or between about 0.01 watt/cm$^3$ to about 1 watt/cm$^3$.

The density modification may be a decrease or increase in density.

In any one of the preceding aspects the density of the material may be modified or enhanced without substantially altering the viscosity. The density of the material may be increased by decreasing gas levels in the material. The gas level may be decreased by between about 1% and about 98%.

Definitions

Figure 1:
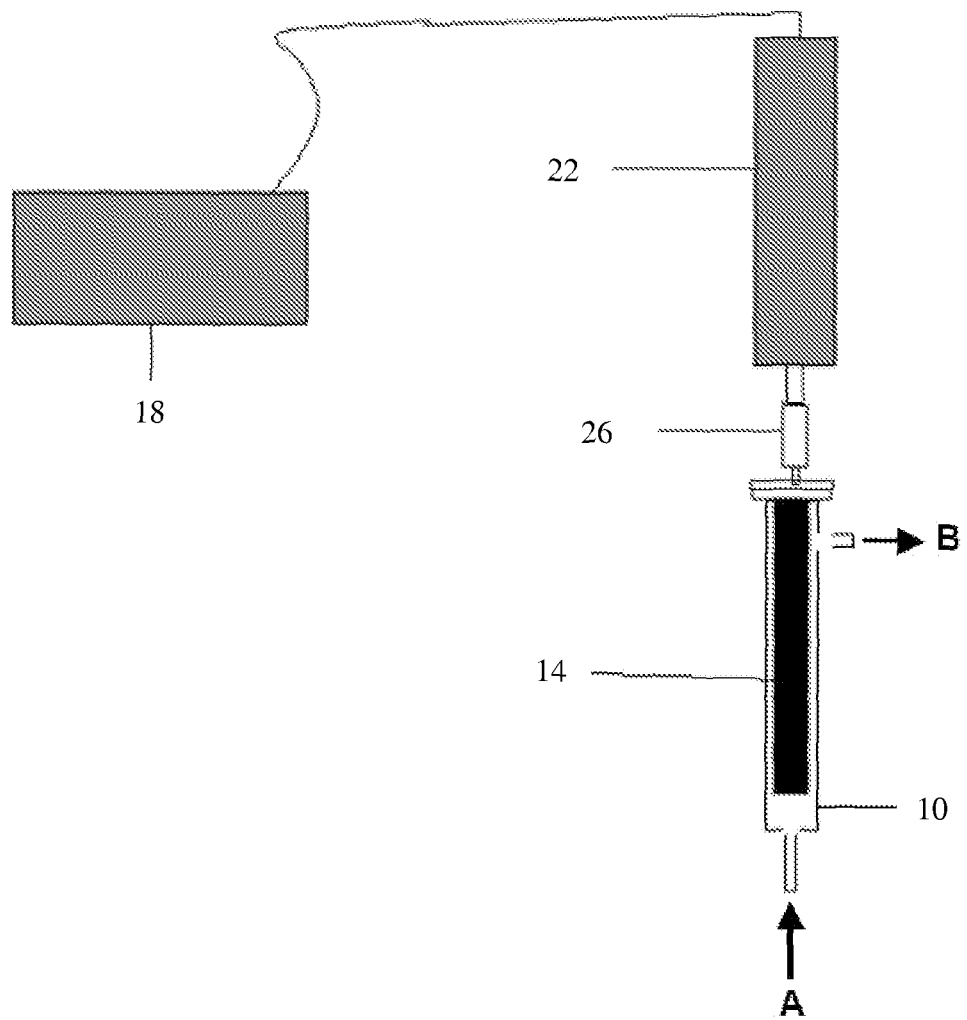
FIG. 1 is a schematic illustration of a highly propagating ultrasonic energy system for enhancing liquid mass transfer and hydration of a product wherein a sonotrode is in direct contact with the product.

The terms "highly propagating radial energy" and "highly propagating ultrasonic energy" are used interchangeably to refer to energy emitted substantially orthogonal to the axial direction of the sonotrode or transducer and which is substantially uniformly distributed throughout a material to which it is applied.

The term "comprising" means including principally, but not necessarily solely. Furthermore, variations of the word "comprising", such as "comprise" and "comprises", have correspondingly varied meanings.

As used in this application, the singular form "a", "an" and "the" include plural references unless the context clearly dictates otherwise. For example, the term "a surface" also includes a plurality of surfaces.

As used herein, the term "synergistic" refers to a greater than additive effect that is produced by a combination of two entities. A synergistic effect exceeds that which would be achieved by combining the effect of each entity taken alone.

As used herein, the term "solid" refers to a substance having a shape and volume and which is neither liquid nor gaseous. A solid may therefore be porous or permeable.

As used herein "modified" refers to an effect that is different to the same effect without the application of highly propagating ultrasonic energy.

DETAILED DESCRIPTION

The skilled person will understand that the figures and examples provided herein are to exemplify, and not to limit the invention and its various embodiments.

Conventional ultrasonic apparatus may be used to modify the density of a flowable material but suffer from a number of disadvantages. For example, the use of conventional ultrasonic energy produced in a conventional apparatus creates standing waves in the product filling the apparatus so that the material will show zones of modified density in areas bounded by the standing waves and zones where density is not in the regions not bounded by the standing waves.

As mentioned above conventional ultrasonic cleaning bath technology/transducers are based on the formation of standing wave technology. Standing waves do not penetrate through materials as the energy levels are very low. Furthermore the formation of standing waves results in areas exposed to the standing waves and areas that are not exposed, typically giving a 50% dead zone. Thus, in a material such as sugar syrup, the result may be that only 50% of the material has modified density.

Further, conventional systems produce energy waves that dissipate very quickly with distance and do not affect the density and little if any penetration into viscous or high percentage solid materials. For example, a conventional sonotrode experiences a drop in energy of 95% over 10 mm from the sonotrode in a material comprising 30% solids, with negligible penetration into surrounding material. The treated zone from these waves produced is not effective across a large volume of material that is cavitation occurs in some areas and not in others.

In accordance with the present invention apparatus and methods for applying highly propagating ultrasonic energy to modify the density of a flowable material are provided. The apparatus generally comprise an ultrasonic generator, at least one ultrasonic transducer arranged such that highly propagating ultrasonic energy is applied either directly or indirectly to the material. The methods of the invention generally comprise the application of highly propagating ultrasonic energy to a flowable material to modify the density of that material. The flowable materials are typically fluids such as liquids but may also comprise at least a portion of solid, porous or colloidal material. The materials may be food or beverage products formulated for human or animal consumption. The products may also be non food products.

The use of highly propagating ultrasonic energy waves provide improvements over existing ultrasonic cleaning technology and sonotrode systems that until now has not been exploited, for example:

1. enhanced working/travel distance of energy waves
2. penetration into viscous or high solid liquids
3. energy of waves maintained at long distances
4. ability of energy waves to uniformly penetrate through products
5. enhance gas removal particularly in very viscous systems Existing sonotrode technology, such as that found in ultrasonic baths, produces waves of very limited propagation distance, very localised and no possibility of penetration into viscous liquids or materials having a high solids content. These systems produce energy waves that dissipate very quickly with distance and do not affect the product density of a fluid or high solids material and do not affect the entrained gas properties of fluids/high solids material. For example, a conventional sonotrode experiences a drop in energy of approximately 95% over 10 mm in 30% solid matrix from the sonotrode, with negligible penetration into surrounding material. The conventional sonotrodes do not emit waves, only produces localised cavitation, so there is no mechanism for transferring the energy through the medium being processed.

Ultrasonic cleaning bath technology/transducers is based on the formation of standing wave technology—standing waves do not have the ability to penetrate uniformly across and through liquids and liquid/solid materials, the energy levels are very low, do not enhance product density of food products and the way in which these standing waves form within a medium means that there are bands of active areas and bands of dead zone—50% dead zone. This means that the formation of standing waves within the medium or across equipment may result in only 50% potentially of wave activity resulting in only partial treatment of the product flow stream.

By way of example, both the above types of conventional ultrasonic technology can be demonstrated in total in-effectiveness for increased product density.

|   | Sonotrode type | % increase in product density for liquid cheese |
|---|---|---|
| 1 | Conventional sonotrode for liquid immersion | 0% |
| 2 | Conventional ultrasonic cleaning - bath | 0% |
| 3 | Highly propagating radial energy | 4.5% |

The above table clearly shows the greatly increased efficacy of the ability of the method of the present invention to enhance the product density in liquid cheese compared to conventional ultrasonic technology.

Highly Propagating Ultrasonic Energy

A sonotrode generates ultrasonic energy typically when an alternating voltage is applied across a ceramic or piezoelectric crystalline material (PZT). The alternating voltage is applied at a desired oscillation frequency to induce movement of the PZT. The PZT transducer is mechanically coupled to the horn means which amplifies the motion of the PZT. The horn means includes a tip portion, referred to herein as a sonotrode. The assembly of the PZT horn means including the tip portion may also be referred to herein as the sonotrode.

Highly propagating ultrasonic energy or HPU includes ultrasonic energy that is emitted substantially orthogonal to the axial direction of a sonotrode. Such energy propagates through a fluid medium, typically water or a gas and over a large distance from the sonotrode and is not limited to the areas immediately surrounding the sonotrode. After propagating through the medium the highly propagating ultrasonic energy may be applied over a surface and to penetrate into said surface.

Highly propagating ultrasonic energy waves are able to propagate across through a viscous product up to a distance of at least 50 cm to about 300 cm, or about 100 cm to about 300 cm or about 150 cm to about 300 cm or about 200 cm to about 300 cm to a contaminated surface. Highly propagating ultrasonic energy propagates substantially uniformly across volumes leaving and are able to penetrate up to up to a depth of about 0.0001-1 mm, or about 1-20 mm, or up to a depth of about 2-20 mm or up to a depth of about 5-20 mm or up to about 5-15 mm or up to about 7-10 mm into substantially solid, porous or colloidal components of a material.

In one embodiment of the present invention a combination of the high power, low frequency, long wavelength and sonotrode shape/design allows for the above effects to take place. In contrast, ultrasonic energy emitted from conventional ultrasonic cleaners has limited propagation distance from the emitting surface with a drop in energy of 90+% at a distance of 100 cm and are not uniform in their volume area or volume of the treated flow stream, and do not have the ability to penetrate into solid, porous or colloidal components of a material.

In another embodiment the sonotrode may be arranged such that the highly propagating ultrasonic energy generated is able to propagate through a material up to a distance of about 50 cm to about 300 cm, or about 100 cm to about 300 cm or about 150 cm to about 300 cm or about 200 cm to about 300 cm to the inner surface of a flow cell, conduit, vessel containing the material, transmit uniformly throughout the whole volume leaving no single space/zone untouched from the wave energy. In addition, the highly propagating radial waves are able to penetrate up to about 5-20 mm or up to about 5-15 mm or up to about 7-10 mm or into solid, porous or colloidal components of suspended in the material.

In yet another embodiment, the highly propagating ultrasonic energy is emitted substantially at a right angle from the surface of a sonotrode with high energy. In this context high energy refers to a less than about 20% drop in energy and production of shear forces resulting from collapsing cavitation bubbles at a distance of about 100 to about 300 cm from the emitting sonotrode. Furthermore, in this context high energy refers to the ability of the highly propagating ultrasonic energy to propagate into solid, porous or colloidal components of a material and create cavitation internally up to a depth of about 0.0001-1 mm, or about 1-20 mm, or up to a depth of about 2-20 mm or up to a depth of about 5-20 mm or up to about 5-15 mm or up to about 7-10 mm.

In one embodiment the ultrasonic emitting assembly or ultrasonic generator generates ultrasonic energy at frequencies between about 10 KHz and about 2000 KHz or between about 10 KHz and about 1500 KHz or between about 10 KHz and about 1000 KHz or between about 10 KHz and about 750 KHz or between about 16 KHz and about 500 KHz or between about 10 KHz and about 400 KHz or between about 10 KHz and about 250 KHz or between about 10 KHz and about 125 KHz or between about 10 KHz and about 100 KHz, or between about 10 KHz and about 60 KHz, or between about 10 KHz and about 40 KHz or between about 10 KHz and about 30 KHz or between about 16 KHz and about 40 KHz or between about 16 KHz and about 30 KHz or between about 16 kHz and about 26 kHz or between about 19 KHz and about 28 KHz or between about 16 KHz and about 22 KHz or between about 16 KHz and about 19.9 KHz.

In one embodiment the amplitude of the highly propagating ultrasonic energy is between about 0.001 to about 500 microns, preferably between about 0.01 to about 40 microns amplitude, more preferably between about 0.01 to about 20 microns, even more preferably between about 1 to about 10 microns.

In one embodiment the energy density of the highly propagating ultrasonic energy is between about of 0.000001 watt/$cm^3$ to 1000 watt/$cm^3$ or between about 0.0001 watt/$cm^3$ to about 1000 watts/$cm^3$ or between about 0.0001 watt/$cm^3$ to about 100 watts/$cm^3$ or between about 0.001 watt/$cm^3$ to about 10 watts/$cm^3$ or between about 0.01 watt/$cm^3$ to about 1 watt/$cm^3$.

In another embodiment the highly propagating ultrasonic energy may be applied to equipment surfaces or to the material directly at an average specific energy between about $1\times10^{-12}$ kWh and about $1\times10^{-1}$ kWh, or between about $1\times10^{-9}$ kWh and about $1\times10^{-4}$ kWh.

In a further embodiment the highly propagating ultrasonic energy is applied to a flowable material or fluid over a period of time from about 0.001 second to about 60 minutes or from about 0.001 second to about 50 minutes or from about 10 seconds to about 40 minutes or from about 15 seconds to about 40 minutes, or from about 20 seconds to about 30 minutes or from about 25 seconds to about 20 minutes or from about 30 seconds to about 10 minutes or from about 30 seconds to about 2 minutes or from about 0.001 second to about 1 minute or from about 0.001 second to about 10 seconds or from about 0.001 second to about 1 second or from about 0.001 second to about 0.1 second or from about 0.001 second to about 0.01 second.

Methods Using Apparatus and Systems of the Invention

The present invention provides methods comprising modification of the density of a flowable material by applying highly propagating ultrasonic energy to the material. While not being bound by a particular theory it is believed the method works by the action of highly propagating ultrasonic waves which cause the gas bubbles present in the liquid or liquid/solid to grow rapidly in size. The gas bubbles grow by the compression and rarefaction cycle of the ultrasonic wave and become so big that they leave the liquid phase by themselves. The elimination of the gas bubbles causes the product density of the liquid or liquid solid to be increased. Also, the highly propagating ultrasonic energy generates cavitation in the material. The high shear energy waves created by the collapsing cavitation bubbles modify the density of the material.

The use of apparatus in the methods of the invention are illustrated herein. For example, with reference to FIG. 1 a flowable material enters a flow cell 10 at A and exits the flow cell 10 at B. During the passage through the flow cell highly propagating ultrasonic energy is emitted from the sonotrode 14 and is applied directly to the material. The highly propagating ultrasonic energy generates cavitation in the material. The high shear energy waves created by the collapsing cavitation bubbles modify the density of the material.

Figure 2:
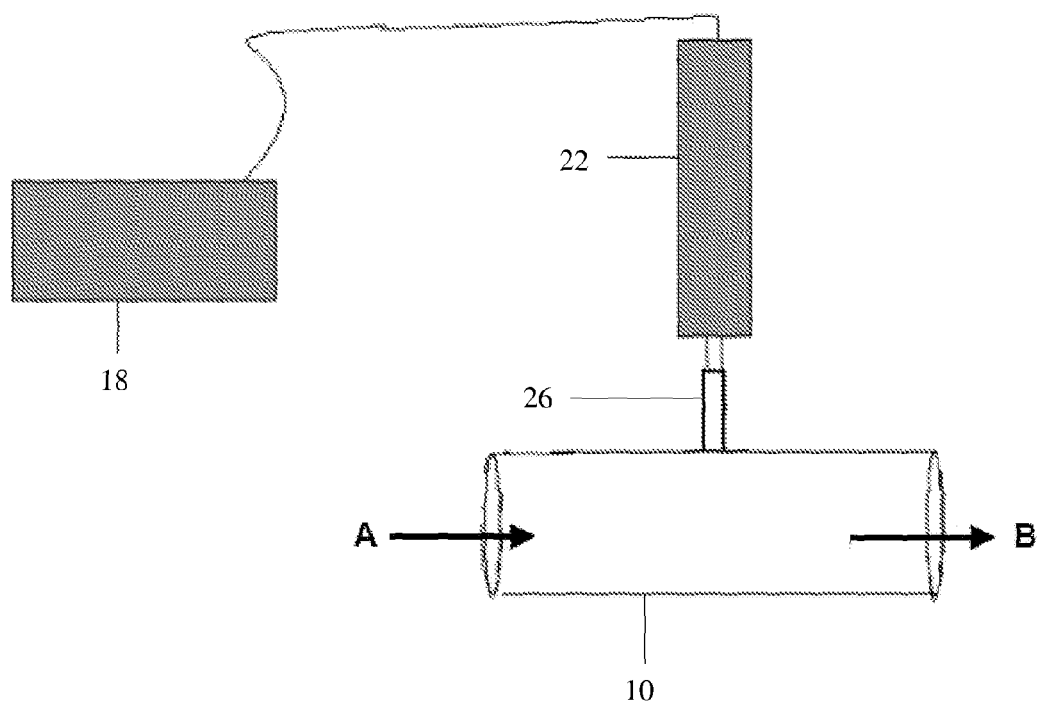
FIG. 2 is a schematic illustration of a highly propagating ultrasonic energy system for enhancing liquid mass transfer and hydration of a product wherein highly propagating ultrasonic energy is applied indirectly to the product.

With reference to FIG. 2 the flow cell is connected to the highly propagating ultrasonic energy generator 18 via a transducer 22 and a booster means 26. Density modification of the material occurs during the passage of the material through the flow cell and highly propagating ultrasonic energy is applied to the material.

Figure 3:
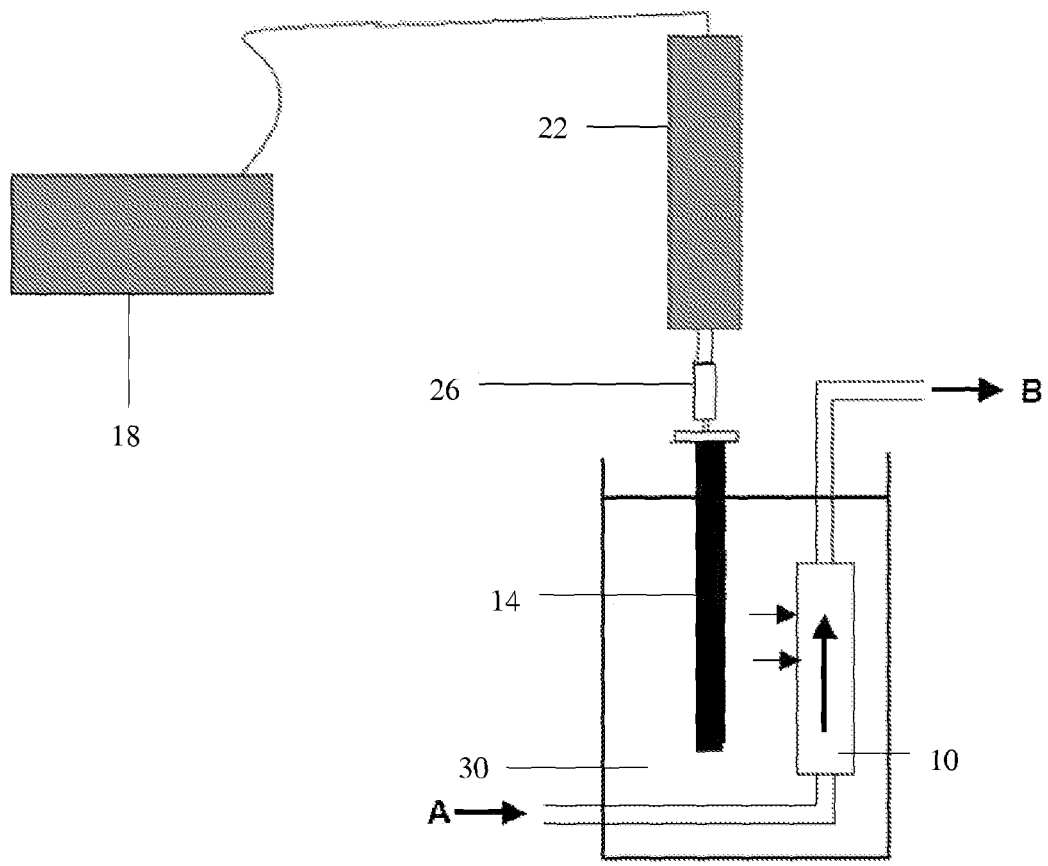
FIG. 3 is a schematic illustration of a highly propagating ultrasonic energy system for enhancing liquid mass transfer and hydration of a product wherein highly propagating ultrasonic energy is indirectly transferred to the product via a fluid.

The material's density is similarly modified by the operation of the apparatus illustrated in FIG. 3 except that the highly propagating ultrasonic energy is indirectly transferred into the material from the sonotrode 14 via a suitable fluid medium 30 to the flow cell 10. The fluid medium may be for example water or oil. The product passes through A into the flow cell 10 and exits the flow cell 10 through B. A highly propagating ultrasonic energy generator 18 is connected to a transducer 22 which is further connected via a booster horn 26 to the sonotrode 14.

The systems of this invention will include a power source, a transducer converting electric energy into mechanical vibrational energy, which is transmitted into the equipment either directly or via a sonotrode. The transducer and sonotrode can provide either radial wave, stationary wave or focused emission, depending on the application. The sonotrode material may be made of titanium or ceramic, steel, cast alloy, or glass. The transducer system may be PZT (piezo ceramic transducer), Terfenol-D magnetostrictive transducer or a Nickel/Iron/Vanadium magnetostrictive material.

The power supply may include automatic resonance frequency tracking so that when the equipment is running during the food product density increasing process, the unit is also always scanning the new resonance frequency (relates to maximum power output) due to changes in the equipment, process conditions and contamination.

The sonotrodes/transducers can be mounted or retrofitted to food/agricultural equipment, tanks, vessels (round, square, oval), troughs, pipes, flow-cells containing the food product. In a preferred embodiment the sonotrode is a radial sonotrode, which is capable of emitting highly propagating ultrasonic energy. However, other sonotrodes may be used such as high amplitude focused sonotrodes, transducers which can be screw bolted or strapped on to the outside of equipment to generate energy wave vibration which modifies density of a material.

A system of the invention is able to apply highly propagating ultrasonic energy waves to a material in filler or packaging lines, to travel large distances along pipes and holding tanks during a packaging operation or to be directly applied to materials at high flow rates during packaging or filling operations. The highly propagating ultrasonic energy emitted by the system produces high energy/amplitude in the material to modify the density of the material. In some embodiments the material may be liquid foods, beverages, foods, agricultural or non-food products. As a result of the application of the highly propagating ultrasonic energy uniformity (or greater uniformity) in product density is achieved. This results in controlled fill levels and thus uniformity in the packaged material.

Increased density modification of liquids, food, agricultural or non-food products may be achieved by using an automatic frequency scanning system for different types of food product. For example, the physical and chemical characteristics of a product will determine the resonance frequency of that product. The ultrasonic resonance frequency is the frequency at which the ultrasonic unit will deliver the greatest energy efficiency.

This invention also provides an ultrasonic system, which locks onto the resonance frequency of a specific type of equipment and then re-scans for the new resonance frequency every 0.001 second throughout the treatment process. Without resonance frequency tracking a variation as little as 10 Hz from the resonance frequency would result in a drop in energy efficiency in the order of 10-40%. This would have a significant negative effect on the efficiency of density modification.

Density Modification

Highly propagating ultrasonic energy may be used to modify the density of a flowable material. Typically such a method includes the application of highly propagating waves across and through multiple surfaces. For example the material may be present in a container or conduit which in contact with an ultrasonic sonotrode.

Density modification of flowable materials such as food, agricultural or non-food products is typically achieved by using an automatic frequency scanning system for different types of equipment. For example, the type of surface (shape, dimensions or type of material) thickness or number of surfaces and type of contamination will determine the resonance frequency of that equipment. The ultrasonic resonance frequency is the frequency at which the ultrasonic unit will deliver the greatest energy efficiency.

The resonance frequency of a material is the frequency of the material at which it oscillates at larger amplitude and power/efficiency compared to other frequencies. At the resonant frequency periodic driving forces (such as the application of highly propagating ultrasonic energy) can produce large amplitude oscillations. While the application of highly propagating ultrasonic energy to a material facilitates density modification, if the frequency of the highly propagating ultrasonic energy is matched to the resonance frequency of the material density modifications will be more efficient than at other frequencies.

The methods described herein are particularly suited for use with an ultrasonic system, which locks onto the resonance frequency of a specific type of equipment and then re-scans for the new resonance frequency every 0.001 second throughout the treatment process. Without resonance frequency tracking a variation as little as 10 Hz from the resonance frequency would result in a drop in energy efficiency in the order of 10-40%. This would have a significant negative effect on density modification efficiency.

By way of example, the resonance frequency of liquid cheese is 20,130 Hz where as milk will have a resonance frequency of 20,198 Hz, the resonance frequency of water/oats is 20,450 Hz where as dairy proteins will have a resonance frequency of 20,260 Hz, whey protein will have a resonance frequency of 20,218 Hz, water and barley grain will have a resonance frequency of 20,320 Hz, rice and water will have a resonance frequency of 20,308 Hz.

Conventional devices using transducers welded/bolted to the outside of vessels/chambers/tubes are not designed with an automatic resonance frequency tracking system for specific types of organic equipments so equipment could not be processed at the correct resonance frequency and maximum power efficiency.

In one embodiment the density of orange juice or canola oil slurry (20% solids) may be enhanced by application of highly propagating ultrasonic energy to the orange juice or slurry. The density of the orange juice and canola oil slurry is enhanced by 5% and 7% respectively after application of highly propagating ultrasonic energy of 24 kHz frequency, energy density 1 watt/cm$^3$. Conventional ultrasonic baths or the use of conventional sonotrodes suitable for liquid immersion typically modify the density of orange juice or canola by less than 1% (see for example Table 1.0, Example 1). However, the application of highly propagating ultrasonic energy enhances density modification of orange juice and canola oil slurry.

In one embodiment the density of a material may be assessed by measuring gas, such as oxygen, in the material. The gas may be dissolved in the material or present in the material as entrained gas. Entrained gas may take the form large bubbles which slow the flow of a flowable material (slug-flow). Such large bubbles may be found in improperly or incompletely filled conduits other sources of entrained gas in this context may be leaks or tank agitation, which cause gas to be introduced into a conduit. Entrained gas may also take the form of 'bubble flow' which is a substantially continuous distribution of gas bubbles in a flowable material. Further gas entrainment may occur on successive cycles of emptying and refilling a container with a flowable material.

Decreased gas levels in the material after application of highly propagating ultrasonic energy indicates an increase in density of the material. Application of highly propagating ultrasonic energy to a material may result in a decrease in gas levels of between about 1% to about 100%, or between about 1% to about 80%, or between about 1% to about 70%, or between about 1% to about 60% or between about 1% to about 50% or between about 1% to about 40% or between about 1% to about 30% or between about 1% to about 20% or between about 1% to about 10%, between about 1% to about 7.5% or between about 1% to about 5%.

In some embodiments density may be measured by any method known in the art such as by displacement methods, pycnometry or hydrostatic weighing.

In preferred embodiments density of a flowable material may enhanced over the density of that material before the application of highly propagating ultrasonic energy by between about 1% to about 100%, or between about 1% to about 80%, or between about 1% to about 70%, or between about 1% to about 60% or between about 1% to about 50% or between about 1% to about 40% or between about 1% to about 30% or between about 1% to about 20% or between about 1% to about 10%, between about 1% to about 7.5% or between about 1% to about 5%.

The application of highly propagating ultrasonic energy enhances density modification at a variety of temperatures. The temperature may be between about 1° C. and 900° C. or between about 1° C. and about 800° C. or between about 1° C. and about 700° C. or between about 1° C. and about 600° C. or between about 1° C. and about 500° C. or between about 1° C. and about 400° C. or between about 1° C. and about 300° C. or between about 1° C. and about 200° C. or between about 1° C. and about 150° C. or between about between about 1° C. and about 125° C. or between about 1° C. and about 100° C. or between about 3° C. and about 90° C. or between about 1° C. and about 75° C. or between about 1° C. and about 50° C. or between about 2° C. and about 25° C. or between about 3° C. and about 20° C. or between about 4° C. and about 15° C. or between about 5° C. and about 10° C.

For example, the temperature of the flowable material may be at least about 900° C. in the case of molten metals such as aluminium.

In some embodiments the application of highly propagating ultrasonic energy enhances density modification at a variety of temperatures less than about 1° C. The temperature may be less than about −50° C. or between about between about −50° C. and about −40° C., or between about between about −40° C. and about −30° C. or between about between about −30° C. and about −20° C. or between about between about −20° C. and about −10° C. or between about between about −10° C. and about −5° C. or between about between about −5° C. and about −1° C. or between about between about −1° C. and about 1° C.

The application of highly propagating ultrasonic energy enhances density modification at a variety of pressures. The pressure may be between about 0.5 bar and about 500 bar, or between about 0.1 bar and about 10 bar or between about 0.1 bar and about 5 bar or between about 1 bar and about 3 bar.

The application of highly propagating ultrasonic energy enhances density modification at a variety of vacuum pressures. The vacuum may be between about 0.1 and about 1 atmosphere negative pressure or between about 0.2 and about 1 atmosphere negative pressure or between about 0.3 and about 1 atmosphere negative pressure or between about 0.4 and about 1 atmosphere negative pressure or between about 0.4 and about 1 atmosphere negative pressure or between about 0.5 and about 1 atmosphere negative or pressure between about 0.6 and about 1 atmosphere negative pressure or between about 0.7 and about 1 atmosphere negative pressure or between about 0.8 and about 1 atmosphere negative pressure or between about 0.9 and about 1 atmosphere negative pressure.

In some embodiments the vacuum may be between about 0 Pa and about 101,300 Pa (approximately 1 atmosphere), or between about 1000 Pa and about 100,000 Pa or between about 2000 Pa and about 100,000 Pa or between about 3000 Pa and about 100,000 Pa or between about 5000 Pa and about 95,000 Pa or between about 10,000 Pa and about 100,000 Pa or between about 50,000 Pa and about 100,000 Pa or between about 75,000 Pa and about 100,000 Pa.

It is generally accepted in the art that there is no direct relationship between density and viscosity. Thus, modification of the density of a flowable material does not necessarily alter the viscosity of the material. Accordingly, in one embodiment the viscosity of the material is not substantially altered on modification or enhancement of the density.

Synergistic Effect of Highly Propagating Ultrasonic Energy and Other Technologies or Agents for Modification of Density.

As disclosed herein the application of highly propagating ultrasonic energy to a flowable material modifies the density of that material. Surprisingly, the application of highly propagating ultrasonic energy to a material together with conventional methods of density modification results in enhanced modification compared to density modification that would be expected merely from the additive effects of conventional methods and the application of highly propagating ultrasonic energy. That is, there is a synergistic effect between the application of highly propagating ultrasonic energy to a solid and the use of conventional methods of density modification. This synergism results in enhanced density modification methods.

The conventional methods of density modification include heat, pressure, the application of a vacuum, agitation or mechanical mixing, polymer chemicals to enhance settling of solids from liquids and enhance the density of the solid phase.

The polymer chemicals may be for example flocculants such as a mineral, natural or synthetic flocculants. Examples of mineral flocculants include activated silica, colloidal clays (e.g. bentonite), polymeric metallic hydroxides (e.g. alum, ferric hydroxide).

Examples of natural flocculants include starch derivatives which may be pregelatinized and thus water-soluble. The starch derivatives may be prepared from natural starches such as corn or potato-starches, anionic oxidized starches or amine treated cationic starches. Examples of other natural flocculants include polysaccharides such as guar gums and alginates.

An example of a synthetic flocculant is polyacrylamide. The polyacrylamide may be co-polymerised with for example acrylic acid to produce a flocculant with an anionic character. Alternatively polyacrylamide may be co-polymerised with for example a cationic monomer produce a flocculant with a cationic character. Examples of other synthetic flocculants include polyethylene-imines, polyamides-amines, polyamines, polyethylene-oxide and sulfonated polymers.

In one aspect highly propagating ultrasonic energy may be applied to a material to enhance the density of that material. The material may be a fluids or medium such as aqueous liquids, oils, non-aqueous liquid/solid streams.

In a further another aspect low frequency/high intensity ultrasound in combination with pressure (0.5 to 500 bar pressure or between about 0.5 and 10 bar or but preferentially between about 2 to 4 bar) may be used to enhance the density of materials such as liquids, food, agricultural or non-food products. A synergistic effect between ultrasonic energy and pressure greatly enhances the coupling and impedance matching of the ultrasonic waves through materials particularly when the material is present as a flow stream and if the material has a high solids content. The improved coupling of the waves to the material enhances density modification.

The highly propagating ultrasonic energy is preferably applied to the material at an average specific energy between $1 \times 10^{-7}$ kWh and $1 \times 10^{-1}$ kWh ultrasonic energy per liter reaction mixture, more preferably between $1 \times 10^{-4}$ kWh and $1 \times 10^{-2}$ kWh ultrasonic energy per liter reaction mixture. Low frequency/high intensity ultrasound in combination with mild heat (0° C.-90° C.) may also be used to enhance density modification.

In one aspect low frequency/high intensity highly propagating ultrasonic energy is applied to a material in combination with pressure. Typically the pressure is between about 0.5 to 10 bar. In some embodiments the pressure is between about 2 bar and about 4 bar or between about 1 bar and about 3 bar. The combination of pressure and low frequency/high intensity highly propagating ultrasonic energy synergistically modifies the density a material. This synergistic effect between ultrasonic energy and pressure greatly enhances the coupling and impedance matching of the ultrasonic waves to the medium particularly when the material has a high solids content. The improved coupling of the waves to the solid enhances the density modification.

In another aspect highly propagating ultrasonic energy is applied to a material in conjunction with a vacuum to synergistically enhance density modification.

With reference to example 12, the application of a vacuum or highly propagating ultrasonic energy to water (flowing at 800 litres per minute) decreases the dissolved oxygen level. When the water is exposed to highly propagating ultrasonic energy of about 4000 watts at a frequency of 18 kHz, amplitude 8 microns under 1 atmosphere negative pressure the dissolved oxygen was decreased from 9 ppm to 0.7 ppm (a 92% drop). This is in contrast to the use of vacuum only, which reduced the dissolved oxygen from 9 ppm to 3.3 ppm (a 63% drop) or the application of highly propagating ultrasonic energy which reduced the dissolved oxygen from 9 ppm to 3.7 ppm (a 59% drop).

In another aspect highly propagating ultrasonic energy is applied to a material in conjunction with heat to synergistically enhance density modification.

With reference to example 13, the application of heat or highly propagating ultrasonic energy to soup decreases the dissolved oxygen level. When a soup flow stream (100 litres/minute) is heated to 50° C. and exposed to highly propagating ultrasonic energy of about 4000 watts at a frequency of 18 kHz, amplitude 8 microns the dissolved oxygen was decreased from 18 ppm to 1.7 ppm (a 90.5% drop). This is in contrast to the use of heat only, which reduced the dissolved oxygen from 18 ppm to 15.3 ppm (a 15% drop) or the application of highly propagating ultrasonic energy alone which reduced the dissolved oxygen from 18 ppm to 9.7 ppm (a 46% drop).

In another aspect highly propagating ultrasonic energy is applied to a material in conjunction with polymer chemicals to enhance settling of solids from liquids to synergistically enhance density modification.

With reference to example 14, the application of highly propagating ultrasonic energy to a flow stream of clay and water slurry in addition to the use of polymer chemicals the settling rate of the clay particles is enhanced and the dissolved oxygen level is decreased. When the slurry containing added polymer chemicals at a flow rate of 10,000 litres per minute is exposed to highly propagating ultrasonic energy of about 16000 watts at a frequency of 17 kHz, amplitude 5 microns the settling rate of clay was 7 seconds (an 88.7% decrease compared to highly propagating ultrasound alone and a 61.1% decrease compared to polymer alone) and the dissolved oxygen decreased from 15 ppm to 1.7 ppm (an 88.7% decrease compared to highly propagating ultrasound alone and a 82.3% decrease compared to polymer alone). This is in contrast to the use of highly propagating ultrasound only where the clay settling rate is 62 seconds and the dissolved oxygen is reduced from 15 ppm to 5.1 ppm (a 66% drop). Further, the use of polymer chemicals only where the clay settling rate is 18 seconds (a 71% decrease compared to highly propagating ultrasound alone) and the dissolved oxygen is reduced from 15 ppm to 14 ppm, (a 0.7% drop).

In a further aspect highly propagating ultrasonic energy is applied to a material in conjunction with conventional homogenisation or mixing to synergistically enhance density modification of the material.

Flowable Materials

As would now be apparent to those skilled in this art, the above invention may be applied to a variety of flowable materials. Flowable materials may include food products such as beverages, milk formulations, yogurt, sauces, liquid tomato products, confectionery, juices, juice concentrates, jams, syrups, honey, coffee, soya protein isolates, starch powders, flour, butter, custard, cream, soups, oils, food containing hydrocolloid materials, food and beverages containing dairy, soya, pectin protein materials, wine, beer, fermented products, spirits, dips (e.g hommus), liquid cheese or cheese products, liquid detergents, liquid pharmaceutical products.

In some embodiments the flowable material may be a liquid or a liquid comprising at least a portion of solid, porous or colloidal material.

In some embodiments the material may be a food product including milk, yogurt, cheese, whey protein, custard, cream, juices and concentrates, smoothie blends of juices and dairy products, oils, sauces, mayonnaise, hydrocolloid materials or any food/beverage product containing a hydrocolloid, wine and wine concentrates, soya protein isolate, dairy proteins, yeast extracts, starch (e.g. potato or corn starch or any type of starch), soya beans, sugar and dextrose syrups, jams, maple syrups, honey, marmalade, syrups, soups, canned soups, beverages, brine solutions, coatings, aqueous and non aqueous liquids, beer, spirits, infant milk nutritional formula or adult milk nutritional formula The juices and concentrates may be selected from the group comprising juices or concentrates of orange, apple, pineapple, mango, blackcurrant, blueberry, cranberry melon, strawberry, raspberry, grape, banana, lemon, lime, grape, grapefruit, guava).

The oils may be selected from the group comprising canola oil, corn oil, soya bean oil, coconut oil, palm oil, sunflower oil, olive oil, cotton seed oil, algae oil, nut oil, citrus peel oil or plant oil extracts.

The hydrocolloid materials may be selected from the group comprising starch, xanthan gum, gum arabic or caraggenan gum or any other type of hydrocolloid.

The beverages may be tea, coffee, juice, chocolate, vanilla, malt, dairy based, herbal, oil emulsion, oil, agricultural extracts based, fermented beverages, spirits, wine products, grape juice or fermented grape juice, beer, ginger beer, sugar or artificial sweetener based drinks, high fructose corn syrup based drinks, dextrose based drinks, concentrates used to make carbonated drinks, fruit cordials containing artificial flavours or natural flavours, water juice blends or water fruit cordial blends, juice/dairy blends, beverages containing hydrocolloids or mixtures of all the above.

In other embodiments the product may be a cosmetic or health care product including tooth paste, mouthwash, facial cream, hand cream, body creams, shampoo, conditioner, soaps or liquid detergents, powder detergents, house cleaning products, industrial cleaning products, pharmaceutical creams and products, prescription medical drugs, hospital drugs, any tablet, granular, powder or liquid health care, pharmaceutical, neutraceutical product.

In some embodiments the product may be liquid cleaning products, fermentation flow streams such as ethanol, biodiesel, beer, wine or dairy.

In other embodiments the product may be a non-food product such as is petroleum oils or petroleum based or petroleum extracts, agricultural extracts, thermoset resins, plastic monomers or polymeric materials, paints, fertilizer products, varnishes, lacquers, engine oils, oils from agricultural products or oils from fish/animal/algae/aquatic products or mining ore or rock slurries such as phosphate slurry.

Density enhancement of mineral or mining materials may be achieved by enhancing the separation kinetics of liquid and solids by the application of highly propagating ultrasonic energy to facilitate separation of gas from the surface of particulates thereby allowing faster separation and a greater degree of separation of the gas and particles thus hastening compaction or settling of the solid phase. In some embodiments the solid material may include mineral particles such as those found in mining slurry such as clay water slurry to enhance the density of clay or other types of mine mineral particles suspended in water such as soil, coal, gypsum, iron ore, titanium dioxide, copper ore, zinc ore, bauxite ore, colour pigment dyes or particles, gold ore, silver ores, sand, silica, or quartz.

Density modification of waste materials may be achieved by enhancing the separation kinetics of liquid and solids due to the application of highly propagating ultrasonic energy to facilitate separation of gas from the surface of solids. In some embodiments the solid material may be waste materials such as those found in sewage slurry, food waste, animal waste, dairy waste, agricultural waste.

In some embodiments the porous material may include fruit pulp, vegetable matter, or protein precipitates.

In other embodiments the flowable material may be substantially non-liquid and may comprise of grain (rice, oats, corn germ, soya, barley, wheat), flour, coffee, tea, milk powders, starch, hydrocolloid powders, clay powders, soils, mineral powders, pulp fibres and powders.

EXAMPLES

Example 1

Density Modification in Fruit Juice and Canola Oil

Ultrasonic energy was applied to orange juice concentrate or canola oil slurry containing 20% solids. The ultrasonic energy was applied to 10 litres of each product for thirty seconds either from a conventional sonotrode, a conventional ultrasonic cleaning bath or from a highly propagating ultrasonic energy sonotrode. A 24 kHz highly propagating ultrasonic energy laboratory unit with a 10 micron amplitude highly propagating radial sonotrode, 24 kHz frequency, energy density 1 watt/cm$^3$ was used. The conventional ultrasonic bath used was a 38 kHz Kerry Ultrasonics bath with an energy density of 0.00001 W/cm$^3$. The conventional sonotrode used was a Branson 250 watt unit with titanium sonotrode 0.3 mm diameter and 28 kHz. Density was calculated by measuring the weight/volume before and after the treatments.

Table 1 clearly shows the increased efficacy of the ability of highly propagating ultrasonic energy to increase product density of both orange juice concentrate and canola oil slurry.

TABLE 1

Product density modification on application of ultrasonic energy

| | Sonotrode type | % product density modification - orange juice concentrate | % product density modification - canola oil slurry (20% solids) |
|---|---|---|---|
| 1. | Conventional sonotrode for liquid immersion | <1% | <1% |
| 2 | Conventional ultrasonic cleaning - bath | <1% | <1% |
| 3 | Highly propagating ultrasonic energy | 7% | 5% |

Example 2

Effect of Application of Highly Propagating Ultrasonic Energy to Modify the Density of Various Food Products Highly propagating ultrasonic energy was applied to 1 Liter of each of the products set out in Tables 2 and 3 over a period of 10 seconds using a 1000 watt highly propagating ultrasonic energy unit, frequencies from 16 kHz to 24 kHz, highly propagating radial sonotrode emitting 10 microns amplitude highly propagating ultrasonic energy at an energy density of 1 watt/cm$^3$.

The density modification of each product was measured using a oxygen meter before and after application of highly propagating ultrasonic energy and the percent increase in product density modification calculated. The results are presented in Tables 2 and 3.

TABLE 2

Product density modification after application of highly propagating ultrasonic energy

| Product | Product density modification % removal of oxygen | Frequency (kHz) of highly propagating ultrasonic energy |
|---|---|---|
| Soya protein isolate | 70 | 18 |
| Corn steep water | 90 | 18 |
| Corn yeast extract | 80 | 20 |
| Nutritional milk formula containing milk powder, caseinate, whey protein, coconut oil, high fructose corn syrup, soya protein isolate | 95 | 17-19.9 |
| Sodium caseinate | 80 | 17-19.9 |

TABLE 2-continued

Product density modification after application of highly propagating ultrasonic energy

| Product | Product density modification % removal of oxygen | Frequency (kHz) of highly propagating ultrasonic energy |
|---|---|---|
| Skimmed milk | 95 | 17-20 |
| Grape juice concentrate | 75 | 20 |
| Starch based food products (100% starch, 80% starch, 60% starch, 40% starch formulations) | 62 | 16-19.9 |
| Carraggenan based food products | 71 | 16-19.9 |
| Honey | 68 | 24 |
| Shellac sugar coating materials | 87 | 20 |
| Palm oil | 80 | 16-21 |
| Canola oil | 81 | 16-21 |
| Coconut oil | 80 | 16-21 |
| Cotton seed oil | 91 | 20 |
| Soya bean oil | 85 | 18 |
| Corn germ oil | 75 | 18 |
| Peanut butter | 70 | 20 |
| Malt liquor extract | 60 | 20 |
| Mango juice | 80 | 18-20 |
| Liquid egg containing xanthan gum | 90 | 17-20 |
| Cocoa liquor | 75 | 18-20 |
| Milk Chocolate | 82 | 17-20 |
| Dairy ice cream | 76 | 20 |
| Yogurt | 80 | 17-24 |
| Dark Chocolate | 70 | 17-20 |
| Liquid coffee extract | 80 | 20 |
| Hydrolysed starch after jet cooking | 58 | 17-20 |
| Gluten water | 96 | 20 |
| Potato starch | 64 | 20 |
| Wine concentrate | 78 | 17-20 |
| Hydrocolloids and water mix | 70 | 16-19.99 |
| Olive oil | 80 | 16-20 |

Example 3

Comparison of Highly Propagating Ultrasonic Energy Product Density Modification and Conventional Product Density Modification Methods Highly propagating ultrasonic energy was applied to 1 Liter of each of the products set out in Table over a period of 5 seconds using a 1000 watt highly propagating ultrasonic energy unit, frequencies from 16 kHz to 24 kHz, highly propagating radial sonotrode emitting 10 microns amplitude highly propagating ultrasonic energy at an energy density of 1 watt/cm$^3$. The product density enhancement of the same products was enhanced by conventional means (vacuum) as indicated in Table 3.

The product density enhancement of each product was measured using a oxygen meter before and after product density enhancement. The results are presented in Table 4.

TABLE 4

Ultrasound product density modification vs. other methods

| Product | Ultrasound Product density modification | Other Product density modification methods |
|---|---|---|
| Liquid egg containing xanthan gum 0.5% | 10 microns amplitude, 17-20 kHz at 10° C. for 5 seconds. 65% gas removed | Vacuum for 5 seconds 45% gas removed |
| Corn mill water | 10 microns amplitude, 17-20 kHz at 10° C. for 5 seconds. 95% gas removed | Vacuum for 5 seconds 60% gas removed |

TABLE 4-continued

Ultrasound product density modification vs. other methods

| Product | Ultrasound Product density modification | Other Product density modification methods |
|---|---|---|
| Skimmed milk | 10 microns amplitude, 17-20 kHz at 10° C. for 5 seconds. 98% gas removed. | Vacuum for 5 seconds 65% gas removed |

Example 4

Density Modification of Liquid Cheese

Highly propagating ultrasonic energy modifies the density of liquid cheese in a canning process allowing for an increase in weight of liquid cheese in the can of 4.5%. The highly propagating radial probe was incorporated into the filler bowl (70 gallon (265 L) volume) containing the liquid cheese which forms part of the packaging line operation. The ultrasound radial probe was also applied to the pipe feeding the filler bowl at a flow rate of 35 gpm (gallons per minute, approximately 132 L per minute). This increased the density of liquid cheese with a weight gain in the can of 4.5%.

Example 5

Density Modification of Orange Juice

Highly propagating ultrasonic energy enhances the density of orange juice in a bottling process by the removal of entrained gas allowing for an increase in weight of product in the bottle of 1.5%. A highly propagating radial probe was incorporated into a filler bowl (100 gallon (approximately 455 L) volume) containing the orange juice which forms part of the packaging line operation. As well as increased density, the ultrasound energy wave treatment was able to extend shelf-life of the product by 1 day due to the entrained gas removal, reduce foam formation in the bottle and speed up the bottling line speed of operation due to a density reduction. The ultrasound radial probe was also applied to the pipe feeding the filler bowl at a flow rate of 45 gpm (gallons per minute, approximately 204 litres per min) and this approach increased the density of orange juice with a weight gain in the bottle of 2.0%. The trial was conducted using a 4 kw unit at 20 kHz frequency with a 5 micron amplitude peak to peak displacement highly propagating radial emitting probe.

Example 6

Density Modification of UHT Milk

Highly propagating ultrasonic energy enhances the density of UHT milk in a bottling process by the removal of entrained gas and density modification allowing for an increase in weight of product in the bottle of 1.5%. The highly propagating radial probe was incorporated into the filler bowl (50 gallon (approximately 227 L) volume) containing the UHT milk which forms part of the packaging line operation. As well as increased density, the ultrasound energy wave treatment was able to give uniform filling levels in the milk packaging operation and increase the filling line speed by 10-20%. The increased density of the milk resulting from the ultrasonic treatment also reduced the amount of foam in the packaging after fill by 80%. The ultrasound radial probe was applied to the pipe feeding the filler bowl at a flow rate of 30 gpm (gallons per minute) and this approach increased the density of UHT milk by 3.5% with an improvement in fill level uniformity (4% bottle rejects at 26 GPM (approximately 118 Litres per minute) conventional process) to 0.5% rejects at 30 GPM (approximately 136 Litres per minute) using ultrasound. The trial was conducted using a 2 kw unit at 20 kHz frequency with a 1-10 micron amplitude peak to peak displacement highly propagating radial emitting probe.

Example 7

Density Modification of Jam

Highly propagating ultrasonic energy enhances the density of jams (strawberry and raspberry formulations) in a packaging process by the removal of entrained gas allowing for an increase in weight of product in the bottle of 3.5%. As well as increased density, the ultrasound energy wave treatment was able to give uniform filling levels in the jam containers and increase the filling line speed by 7-20%. The increased density of the jam resulting from the ultrasonic treatment also reduced the amount of foam in the packaging, after fill, by 35%. The ultrasound radial probe was applied to the pipe feeding the filler bowl at a flow rate of 23-25 gallons per minute (approximately 104-114 litres per minute) and this approach increased the density of jam by 3.5% with an improvement in fill level uniformity (4.5% container rejects at 20 GPM (approximately 90 litres per minute) conventional process) to 1% rejects at 23-25 GPM using ultrasound. The trial was conducted using a 4 kw unit at 20 kHz frequency with a 1-8 micron amplitude peak to peak displacement highly propagating radial emitting probe.

Example 8

Density Modification of Coffee Beans

Highly propagating ultrasonic energy was used to enhance the density of roasted coffee beans and ground coffee by 5% by removing entrained gas in the coffee beans/grounds. Using the highly propagating radial probe in a batch holding tank prior to filling into the packaging containers and pouches, the ultrasonic waves removed 85% of the gas present in the coffee products. As well as increasing product density, the number of pouches of coffee with no expansion in the packaging material after filling/sealing was reduced by 90%.

Example 9

Summary of Density Modification of Foods

Highly propagating ultrasonic energy was applied to the food products set out in Table 5.

TABLE 5

Examples of density modification of food products

| Food Product | Density increase over control process | Packaging line increase | Conditions |
|---|---|---|---|
| Chocolate | +3% | na | Amplitude 4 microns, frequency 20 kHz |
| Tomato pasta sauce | +4.5% | +15% | Amplitude 25 microns, frequency 18 kHz |
| Soya protein isolate | +5.5% | na | Amplitude 30 microns, frequency 18 kHz |
| Cola concentrate | +2.5% | na | Amplitude 5 microns, frequency 20 kHz |
| Coffee and chocolate milk flavour beverages | +3% | +10% | Amplitude 5 microns, frequency 20 kHz |
| Flavoured beverages | +3% | +10% | Amplitude 3 microns, frequency 20 kHz |

Example 10

Density Modification of Milk, White and Dark Chocolate

Highly propagating ultrasonic energy enhances the density of chocolate (dark, milk and white formulations) in a packaging process. As well as increased density, the ultrasound treatment was improves filling levels in the mould containers and increases the filling line speed by 7 to 20%.

A highly propagating ultrasonic energy radial probe was applied to a pipe feeding a filler bowl at a flow rate of 25 gallons per minute (approximately 114 litres per minute). Highly propagating ultrasonic energy was emitted from the probe and applied to the flow stream at 4000 watts, 18 kHz frequency with a 1-8 micron amplitude peak to peak displacement. This increased the density of chocolate and reduced gas entrainment by 83% for milk chocolate, 85% for dark chocolate and 82% for white chocolate. Further, the moulded chocolate products had significantly improved visual appearance and fewer visible bubbles.

Example 11

Density Modification of Aluminium Melts

The application of highly propagating ultrasonic energy enhances the density of moulded aluminium and results in improved physical structural properties. Molten aluminium at 750-850° C. with or without the application of highly propagating ultrasonic energy was cast into moulds. Without the application of highly propagating ultrasonic energy the cast aluminium contained 20 ppm gas. However, on application of highly propagating ultrasonic energy at 20 kHz for 10 seconds the cast aluminium contained 1.5 ppm gas, a 92.5% decrease in gas levels. As gas in cast aluminium creates poor physical properties (such as local areas of weakness) when the aluminium solidifies the removal of gas by the application highly propagating ultrasonic energy improves the physical properties of the cast aluminium.

Example 12

Density Modification of Water—Synergistic Effect of Highly Propagating Ultrasonic Energy and a Vacuum Highly propagating ultrasonic energy (18 kHz, 4,000 watts power, amplitude 8 microns) was applied to water which was flowing at a rate of 800 litres per minute. The flow was under a vacuum of 1 atmosphere negative pressure. The level of dissolved oxygen was measured.

The level of dissolved oxygen was 9 ppm in untreated water (no highly propagating ultrasonic energy or vacuum). After application of a vacuum (negative 1 atmosphere) the level of dissolved oxygen dropped to 3.3 ppm (a 63% drop). Application only of highly propagating ultrasonic energy only resulted in a drop of the level of dissolved oxygen dropped from 9 ppm to 3.7 ppm (a 59% drop).

The combination of a vacuum and the application of highly propagating ultrasonic energy resulted in a drop in dissolved oxygen levels from 9 ppm to 0.7 ppm (a 92% drop).

Example 13

Density Modification of Soup—Synergistic Effect of Highly Propagating Ultrasonic Energy and Heat The application of heat or highly propagating ultrasonic energy to soup decreases the dissolved oxygen level. A soup flow stream (100 litres/minute) was heated to 50° C. and exposed to highly propagating ultrasonic energy of 4000 watts at a frequency of 18 kHz, amplitude 8 microns. The dissolved oxygen was decreased from 18 ppm to 1.7 ppm (a 90.5% drop).

In control experiments the same flow stream was heated to 50° C. which resulted in a decrease in dissolved oxygen from 18 ppm to 15.3 ppm (a 15% drop). The application of highly propagating ultrasonic energy alone to the flow stream resulted in a decrease in dissolved oxygen from 18 ppm to 9.7 ppm (a 46% drop).

Example 14

Density Modification of a Clay and Water Slurry—Synergistic Effect of Highly Propagating Ultrasonic Energy and Polymer Chemicals The application of highly propagating ultrasonic energy to a flow stream of clay and water slurry decreases the dissolved oxygen level and increases the rate at which clay particles settle. A flow stream of clay water slurry at a flow rate of 10,000 litres per minute was exposed to highly propagating ultrasonic energy of 16000 watts at a frequency of 17 kHz, amplitude 5 microns. A 3 litre sample was taken in taken in a glass measuring cylinder and the time for the clay to settle to 500 ml level was measured as 62 seconds. The level of dissolved oxygen prior to the application of highly propagating ultrasonic energy to the flow stream was measured at 15 ppm. After application of highly propagating ultrasonic energy the dissolved oxygen was measured as 5.1 ppm (a 66% drop).

In another experiment polymer chemicals only were added to the flow stream. A 3 litre sample was taken in taken in a glass measuring cylinder and the time for the clay to settle to 500 ml level was measured as 18 seconds (a 71% decrease compared to highly propagating ultrasound alone). The level of dissolved oxygen prior to the addition of polymer chemicals to the flow stream was measured as 15 ppm. After addition of polymer chemicals to the flow stream the dissolved oxygen was measured as 14 ppm (a 0.7% decrease compared to highly propagating ultrasound alone).

The flow stream of clay water slurry, with the polymer chemicals was exposed to highly propagating ultrasonic energy of 16000 watts at a frequency of 17 kHz, amplitude 5 microns. A 3 litre sample was taken in taken in a glass measuring cylinder and the time for the clay to settle to 500 ml level was measured as 7 seconds (an 88.7% decrease compared to highly propagating ultrasound alone and a 61.1% decrease compared to polymer alone). The level of dissolved oxygen prior to the addition of polymer chemicals and application of highly propagating ultrasonic energy was measured at 15 ppm. After addition of polymer chemicals and application of highly propagating ultrasonic energy to the flow stream the dissolved oxygen was measured as 1.7 ppm (an 88.7% decrease compared to highly propagating ultrasound alone and a 82.3% decrease compared to polymer alone).

The invention claimed is:

1. A method for increasing the density of a flowable material in need thereof comprising:
   applying highly propagating ultrasonic energy at a frequency of between about 16 kHz to about 30 kHz to the material, at an amplitude of from about 1 micron to about 20 microns and at an energy density of from about 0.001 watt/cm$^3$ to about 10 watts/cm$^3$, and wherein the highly propagating ultrasonic energy is uniformly distributed throughout the material thereby increasing the density of the material by between about 1% to about 20% compared to the density of the material before the application of the highly propagating ultrasonic energy;
   wherein said flowable material comprises a liquid material and the highly propagating ultrasonic energy is applied to the material as it flows in a filler or packaging line, and wherein application of the highly propagating ultrasonic energy to the material results in decreased gas levels and increased density in the material.

2. The method of claim 1 further comprising:
   (i) applying heat to the mixture;
   (ii) applying to the mixture pressure;
   (iii) homogenising or emulsifying the material;
   (iv) mixing or agitating the material;
   (v) applying a vacuum to the material; or
   (vi) adding a polymer to the material.

3. The method of claim 2 wherein the highly propagating ultrasonic energy and the:
   (i) heat;
   (ii) pressure;
   (iii) homogenisation or emulsification;
   (iv) mixing or agitation;
   (v) vacuum; or
   (vi) polymer;
   act together to increase the density of the material.

4. The method of claim 1 wherein the material is provided as a pre-mixture of a solid and a liquid.

5. The method of claim 1 wherein the temperature of the material is between about 1° C. and about 900° C.

6. The method of claim 1 wherein the temperature of the material is less than about 1° C.

7. The method of claim 1 wherein:
   (i) the frequency of the highly propagating ultrasonic energy is about the resonant frequency of the material;
   (ii) the amplitude of the highly propagating ultrasonic energy is between about 1 to about 10 microns;
   (iii) the highly propagating ultrasonic energy is applied over a period of time between about 0.001 second to about 24 hours;

(iv) the highly propagating ultrasonic energy is applied to the material at an average specific energy between $1\times10^{-4}$ kWh and $1\times10^{-2}$ kWh ultrasonic energy per liter of material;

(v) the frequency of the highly propagating ultrasonic energy is between about 16 kHz and about 25 kHz;

(vi) the frequency of the highly propagating ultrasonic energy is about the resonance frequency of the material to which it is applied;

(vii) the highly propagating ultrasonic energy is applied to the material at an energy density of between about 0.01 watt/cm$^3$ to about 1 watt/cm$^3$; or any combination of (i) to (vii) above.

8. The method of claim 1 wherein the density of the material increased without substantially altering the viscosity of the material.

9. The method of claim 1 wherein the gas level is decreased by between about 1% and about 98%.

10. The method of claim 1, wherein said liquid material is selected from foods and beverages.

11. A method of increasing the density of a flowable material comprising application of highly propagating ultrasonic energy to a flow stream thereby increasing the density of the material by between about 1% to about 20% compared to the density of the material before the application of the highly propagating ultrasonic energy, and wherein the ultrasonic energy propagates across and through multiple surfaces, wherein said highly propagating ultrasonic energy is emitted at a frequency of between about 16 kHz to about 30 kHz to the material, at an amplitude of from about 1 micron to about 20 microns and at an energy density of from about 0.001 watt/cm$^3$ to about 10 watts/cm$^3$;

wherein said flowable material comprises a liquid material and the highly propagating ultrasonic energy is applied to the material as it flows in a filler or packaging line, and wherein application of the highly propagating ultrasonic energy to the material results in decreased gas levels and increased density in the material.

12. The method of claim 11 for increasing the density of a flowable material present in a flow stream comprising the material as the flow stream passes through an apparatus, the method comprising;

(i) attaching a high power transducer to an external surface of the apparatus; and (ii) operating the transducer to emit highly propagating ultrasonic energy, wherein the highly propagating ultrasonic energy propagates across and through multiple surfaces and is applied to the material and wherein the application of highly propagating ultrasonic energy to said material thereby increases the density of the material.

13. The method of claim 11, wherein said liquid material is selected from foods and beverages.

14. A method of increasing the density of liquid food materials during packaging comprising applying highly propagating ultrasonic energy to a food material flow stream or to equipment containing the food material thereby increasing the density of the food material by between about 1% to about 20% compared to the density of the material before the application of the highly propagating ultrasonic energy, and, wherein said highly propagating ultrasonic energy is emitted at a frequency of between about 16 kHz to about 30 kHz to the material, at an amplitude of from about 1 micron to about 20 microns and at an energy density of from about 0.001 watt/cm$^3$ to about 10 watts/cm$^3$, wherein application of the highly propagating ultrasonic energy to the material results in decreased gas level and increased density in the material.

15. The method of claim 14 wherein the highly propagating ultrasonic energy is applied from a transducer in contact with the equipment, creating highly propagating radial waves across and through multiple surfaces.

16. The method of claim 15 wherein the highly propagating ultrasonic energy is applied from a sonotrode immersed into a coupling liquid.

17. The method of claim 16 wherein the sonotrode vibrates at a frequency of between 16 KHz and 25 KHz, at an amplitude of from about 1 micron to about 10 microns and at an energy density of from about 0.01 watt/cm$^3$ to about 1 watt/cm$^3$, and emits a radial energy wave relative to the sonotrode and wherein the radial energy wave travels through the equipment and/or material flow stream and increases the density of the material.

18. The method of claim 16 wherein the temperature of the material is between 2° C. and 90° C.

* * * * *